Patented Mar. 2, 1948

2,437,060

UNITED STATES PATENT OFFICE

2,437,060

PROCESS OF RECOVERING GAMMA GLOBULINS FROM HUMAN BLOOD SERUM

John W. Williams and Harold F. Deutsch, Madison, Wis., assignors to the United States of America, as represented by the Secretary of War No Drawing. Application October 23, 1945, Serial No. 624,102

5 Claims. (Cl. 260—112)

This invention relates to a method of recovering serum gamma globulins and more particularly to the application of this method to the recovery of gamma globulins from certain by-product fractions obtained from the process of preparing normal human serum albumin.

The large scale separation of the albumin fraction from human blood plasma for use as a blood substitute and in the treatment of shock has made available, as by-products, the serum globulins. In one large fraction which is known as fraction II+III, there are separated some of the beta and practically all of the gamma globulins. A number of the antibodies against a variety of pathogenic agents and other antigens are associated with or actually consist of gamma globulin. Thus, it becomes of practical importance to separate the gamma globulin from the II+III paste, and industrial procedures have been developed to break this fraction into three sub-fractions which are designated as II, III—1 and III—2. Fraction II is called serum gamma globulin (immune), fraction III—1 contains some gamma globulin in mixture with beta globulin, and fraction III—2 is largely beta globulin which is rich in prothrombin.

The procedure for obtaining the foregoing fractions does not form a part of this invention but is set forth below to illustrate the manner in which the required starting materials are produced. This method comprises adding 0.231 liter of 53.3% ethanol to each liter of citrated human plasma at a temperature of from −2° C. to −3° C. to bring the concentration thereof to 10%. At this concentration of ethanol a precipitate forms which consists largely of fibrinogen. This is removed by centrifuging and .530 liter of 53.3% ethanol is then added for each liter of supernatant fluid to bring the ethanol concentration to 25%. The temperature is maintained at −5° C. during this addition and a precipitate forms which consists principally of beta and gamma globulins. The precipitate is designated as fraction II+III and is recovered by centrifuging. The supernatant fluid may be further processed to recover normal human serum albumin.

Each kilogram of the precipitate, fraction II+III obtained as described above, is suspended in 1 liter of 0° C. pyrogen-free water and 17.5 grams of sodium chloride. This suspension should be stirred slowly and kept at a temperature below 0° C. After the suspension is complete, another 1.5 liters of 0° C. water should be added for each kilogram of precipitate II+III taken. This suspension is then stirred gently during and for 30 minutes after the addition of 8,000 units of human thrombin for each kilogram of II+III precipitate. A precipitate forms which consists principally of fibrin, and may be discarded. It is removed by centrifuging the above suspension at a fairly slow rate, i. e. about 20 liters per hour.

The effluent from the above precipitate is brought to a salt concentration of 0.08 mole per liter and the pH to 5.1–5.2 by the addition of an acetate buffer which has a mole ratio of acetic acid to sodium acetate of 0.75. This can be conveniently done by adding about 25 cc. of acetate buffer (2M NaAc and 1.5M HAc) in 1.7 liters of 0° C. water for each kilogram of effluent used. This addition should require about 45 minutes, and the solution should be kept at a temperature of 0±0.5° C. A precipitate (III—2) is formed which consists largely of beta-globulins, and contains most or all of the prothrombin present. It may be removed by centrifugation at a rate of about 100 liters per hour, and at a temperature between 0.5 and −0.5° C.

The effluent from precipitate III—2 is brought to an alcohol concentration of 15% by volume, the pH remaining as adjusted for the precipitation of III—2 (5.1–5.3), and the total volume of the system is increased to approximately the original plasma volume from which it was obtained. This can be done by adding 770 cc. of 31.5% ethanol solution, at −5° or colder, for each kilogram of effluent from precipitate III—2. A precipitate (III—1) forms which consists largely of beta-globulins, and is rich in chlorosterol. It contains most of the isohemagglutinins and the "O" typhoid agglutinin. It also contains some 50 per cent of the total gamma globulin. It can be removed by centrifugation of the above suspension at a temperature between −4.5 and −5.5° C., and at a rate of about 100 liters per hour.

The effluent from precipitate III—1 is brought to a pH of about 6.8–7.4 and an alcohol concentration of 25% by volume. This can be done by the addition first of about 21 cc. of 0.8 M sodium bicarbonate solution, and then of 143 cc. of 95% ethanol, precooled to −5° C. or colder, for each kilogram of effluent taken. The bicarbonate should be added soon after the filtration of effluent III—1, and the addition of the alcohol should be made at a rate so that the solution is always nearly at the freezing point until a temperature of −5° C. has been reached. The final temperature may be between −5° and −9° C., and during the additions the solution should be stirred vigorously but in such a way that it does not foam. A precipitate (II) is formed which consists largely of gamma-globulins, and contains most of the antibodies for which tests have been carried out, excepting those mentioned as present in III—1. It can be removed by centrifugation of the above suspension at a temperature between −5° and −9° C., and at a rate of about 40–50 liters per hour. It may be dried from the frozen state. The shell-freezing of the material is somewhat easier if it is suspended in about an equal volume of water, half of which has been frozen just before mixing.

The fraction III—1 obtained by the above described method has, heretofore, been considered a waste product and until the disclosure of the process of enzymatic hydrolysis or digestion of human serum globulins by J. W. Williams, M. L. Peterman and W. B. Bridgman in the copending application, Serial Number 623,796, filed October 22, 1945, no method was available for the efficient recovery from it of the immune gamma globulins. The process disclosed in the copending application involves digesting gamma globulins with certain proteolytic enzymes to break down the gamma globulin molecule to units of one-half and one-quarter size without impairing the important antibody reactions. Since it has been found to be possible to fractionate the digest system more or less into the different size categories, there exists new and important methods for further concentration and purification of the immune bodies. The foregoing method, however, is somewhat difficult to carry out in large scale operations owing to the enzymatic digestion step. Furthermore, existing commercial procedures for obtaining serum gamma globulins are characterized by low yields. One such method provides a yield of from 40–50% gamma globulin while another provides only from 25–35%.

It is the principal object of this invention to provide a simple, inexpensive process for recovering serum gamma globulin which affords high yields. Another object of this invention is to provide a process for recovering serum gamma globulin directly from the fraction II+III globulins obtained in the preparation of normal human serum albumin. Still another object of this invention is to provide a method of recovering serum gamma globulin having good stability, high purity and the requisite immunological assay.

This invention is based on the discovery that a suspension of a paste containing both beta and gamma globulins in a medium in which the ionic strength is maintained at the low level of 0.010 to 0.015, the pH at 5.13±0.05, and the alcohol concentration of 15 to 17% forms a solution containing a large portion of the gamma globulin without the gamma globulins being "salted-out" from said solution. The method comprises suspending the fraction II+III paste in pyrogen-free water, preferably about 10 liters for each kilogram of paste and adjusting the hydrogen ion concentration to pH 4.0 to 5.1. This suspension is allowed to stand up to twenty-four hours during which time it may be stirred. In the case of fraction III—1 pastes, the initial suspension may be prepared by adding the paste to a small volume of an aqueous solution of sodium chloride, increasing the volume of the suspension by adding pyrogen-free water, preferably enough to bring the volume to about 18 liters for each kilogram of paste suspended, and thereafter adjusting the pH of the suspension to 4.0 to 5.1. Following the period in which II+III or III—1 suspensions are allowed to stand, the hydrogen ion concentration of the suspension is adjusted to pH 5.13±0.05 and the volume of the suspension further increased, preferably to about 20 liters for each kilogram of paste suspended. All pH values are measured at 25° C., and before alcohol additions.

The suspensions prepared by the methods described above are then treated by introducing ethanol until an ethanol concentration of from 15 to 17% is reached. The ionic strength of the suspension following the addition of ethanol must be maintained at a low level, e. g., from 0.010 to 0.015, to accomplish the desired result. The ionic strength must be maintained between these values and the pH must be carefully controlled if high yields of gamma globulin are to be obtained. A precipitate forms following the addition of ethanol which consists largely of beta globulins. The suspension is stirred for from one to two hours and is then centrifuged at a temperature just above the freezing point of the solution. The effluent is then filtered through a thin pad of a suitable filter aid and sodium bicarbonate solution added thereto until the pH is from 7.0 to 7.2. Ethanol is then added to the effluent until the ethanol concentration is approximately 20 to 25%. A precipitate forms which consists largely of gamma globulins. These gamma globulins contain many of the immune bodies. This precipitate may be removed by centrifuging. These gamma globulins may be then suspended in water, shell frozen and dried by standard methods. The process described above must be conducted in the cold at all times. It is especially important that low temperatures be maintained during the steps of adding ethanol to the suspensions.

In order more clearly to disclose the nature of the present invention, specific examples will hereinafter be described in considerable detail. It should be clearly understood, however, that this is done solely by way of example and not for the purpose of restricting the scope of the appended claims.

*Example I*

Each kilogram of fraction III—1 precipitate is suspended in 10 liters of 0° C. pyrogen-free water. This suspension should be stirred and kept at a temperature of 0° C. as 460 ml. of 0.05 M acetic acid is slowly added. The pH of the solution should be 4.80±0.05 after this addition is completed. After stirring for 1–2 hours at 0° C., a mixture, again at 0° C., of 4500 ml. 0.05 M acetic acid and 3250 ml. 0.05 M $Na_2HPO_4$ is introduced into the system. The solution then should have pH=5.13±0.05.

The solution containing 1 kg. of paste is now brought to a volume of 20 liters with 0° C. pyrogen-free water and stirred for one hour. The ethanol concentration is brought to 17% by the addition of 9.1 liters of 53.3% alcohol. The ionic strength of the suspension following the addition of ethanol is 0.013. During this addition the temperature is kept as low as possible without freezing and it should be −6° C. when 17% concentration is reached. After stirring for one hour at this temperature the precipitate is removed by centrifugation, again at −6° C.

The effluent is filtered through a thin pad of a suitable filter aid. After the pH of the filtered effluent is adjusted to 7.1±0.1 by the addition of 650 ml. of 0.5 M $NaHCO_3$, the alcohol concentration is brought to 20 to 25% with 95% ethanol, pre-cooled to −5° C. or colder. The precipitate which forms is removed by centrifugation at a temperature not higher than −5° C. It is dried from the frozen state in the usual manner.

This precipitate consists largely of gamma globulins, approximately 95%, and represents nearly two-thirds of the total gamma globulin which was present in the original fraction III—1 paste.

The results obtained by several experiments performed employing 200 grams of fraction III—1 paste are given in the following table:

| Experiment | Treatment | | Per cent EtOH | Ionic Strength | Yield Grams Gamma Globulin | Electrophoresis | | | |
|---|---|---|---|---|---|---|---|---|---|
| | pH | Hours | | | | $\alpha$ | $\beta_2$ | $\beta_1$ | alb. |
| A-14A | 4.16 | 14 | 17 | 0.013 | 14.2 | 98 | 1 | 0 | 1 |
| A-16B | 4.92 | 16 | 17 | 0.010 | 14.4 | 94 | 3 | 0 | 3 |
| A-19 | 4.86 | 17 | 17 | 0.014 | 13.5 | 99 | 0 | 0 | 1 |

Example II

Each kilogram of a fraction II+III precipitate is suspended in 8 liters of 0° C. pyrogen-free water. In order to bring the pH of the system to 4.80±0.05 there is added 3000 ml. of 0.05 M acetic acid always keeping the system at 0° C. After the solution has been slowly stirred for periods up to twenty-four hours at 0° C., a mixture of 3400 ml. 0.05 M acetic acid and 3400 ml. of 0.05 M $Na_2HPO_4$ is added, again at 0° C., to bring the pH to 5.13±0.05.

The solution containing 1 kg. of paste is now brought to a volume of 25 liters with 0° C. pyrogen-free water and stirred for one hour. The ethanol concentration is brought to 17% by the addition of 11.25 liters of 53.3% alcohol. The ionic strength following this addition of ethanol is 0.012. During this addition the temperature is kept as low as possible without freezing and it should be −6° C. when 17% concentration is reached. After stirring for one hour at this temperature the precipitate is removed by centrifugation, again at −6° C.

The effluent is filtered through a thin pad of a suitable filter aid. After the pH of the filtered effluent is adjusted to 7.1±0.1 by the addition of 900 ml. of 0.5 M $NaHCO_3$ the alcohol concentration is brought from 20 to 25% with 95% ethanol, pre-cooled to −5° C. or colder. The precipitate formed is removed by centrifugation at a temperature not higher than −5° C. It is dried from the frozen state in the usual manner.

The precipitate obtained in this manner has a purity of some 95% in gamma globulins and represents a yield of approximately 75%.

The results obtained by several experiments performed employing 200 grams of fraction II+III paste are given in the following table:

| Experiment | Treatment | | Per cent EtOH | Ionic Strength | Yield in Grams | Electrophoresis | | | |
|---|---|---|---|---|---|---|---|---|---|
| | pH | Hours | | | | $\alpha$ | $\beta_2$ | $\beta_1$ | alb. |
| A-7 | 4.80 | 10 | 17 | 0.012 | 18.8 | 97 | 2 | 0 | 1 |
| A-8C | 4.81 | 12 | 17 | 0.015 | 17.6 | 97 | 2 | 0 | 1 |
| A-9B | 4.76 | 0.3 | 17 | 0.014 | 16.3 | 97 | 2 | 0 | 1 |

Example III

Each kilogram of fraction II+III is suspended in 10 liters of 0° C. pyrogen-free water. In order to bring the pH of the system to pH 4.8±0.05 there is added 4850 ml. of a dilute pH 4.0 solution. (This solution is prepared by adding 680 ml. of 0.050 M $Na_2HPO_4$ to 4170 ml. of 0.050 N acetic acid.) After the system has been slowly stirred overnight at 0° C., a buffer mixture of 2640 ml. of 0.050 M $Na_2HPO_4$ and 2260 ml. of 0.050 N acetic acid is added, again at 0° C., to bring the pH to 5.13±0.05.

The solution containing 1 kg. of paste is now brought to a volume of 25.0 liters with 0° C. pyrogen-free water. The ethanol concentration is brought to 17% by the addition of 11.25 liters of 53.3% alcohol. The ionic strength is 0.012 at this point. During this addition the temperature is kept as low as possible without freezing; it should be −6.5° C. when 17% concentration is reached. After stirring for one hour at this temperature the precipitate, a new III—1 residue, is removed by centrifugation, again at −6.5° C.

The effluent is filtered through a thin pad of suitable filter aid. After the pH of the filtered effluent is adjusted to 7.1±0.1 by the addition of about 900 ml. of 0.50 M $NaHCO_3$, the alcohol concentration is brought to 25% with 95% ethanol, pre-cooled to −5° C. or colder. The precipitate, gamma globulin, is removed by centrifugation at a temperature not higher than −5° C. It is dried from the frozen state in the usual manner.

The precipitate obtained in this manner has a purity of 95% in gamma globulin and represents a yield of approximately 70-75%.

Having thus described our invention, what we claim as new and wish to secure by Letters Patent is:

1. The method of recovering human serum gamma globulins which contain immune bodies from mixtures of human serum beta and gamma globulins which comprises, forming a suspension of a mixture of human serum beta and gamma globulins, adding a compound selected from an acid and acid buffer solution to adjust the pH to from 4.0 to 5.1, adjusting the pH to from 5.03 to 5.18, stirring said suspension, adding 0° C. pyrogen-free water containing sufficient electrolyte to provide a predetermined low level of ionic strength until the volume is approximately 20 liters per kilogram of said mixture suspended, adding ethanol until the ethanol concentration is from 15 to 17% and the ionic strength is 0.010 to 0.015 to precipitate the beta globulins, centrifuging to remove said precipitate, adjusting the pH of the effluent to from 7.0 to 7.2, adding ethanol to said effluent until the ethanol concentration is from 20 to 25% to precipitate the gamma globulins, and centrifuging to recover said gamma globulins.

2. The method of recovering human serum gamma globulins which contain certain immune bodies from mixtures of human serum beta and gamma globulins which comprises, suspending a mixture of human serum beta and gamma globulins in from 8 to 12 liters of 0° C. pyrogen-free water per kilogram of said mixture, adjusting the pH to from 4.0 to 5.1, stirring said suspension, adjusting the pH to from 5.08 to 5.18, adding 0° C. pyrogen-free water containing dissolved electrolyte in amount sufficient to provide a predetermined low level of ionic strength, the said water being added to give a volume of 25 liters per kilogram of said mixture suspended, and 53.3% aqueous ethanol until the ethanol concentration is from 15 to 17% with a resultant ionic strength of 0.010 to 0.015 to precipitate the beta globulins, centrifuging to remove said precipitate, adjusting the pH of the effluent to from 7.0 to 7.2, adding ethanol until the ethanol concentration of said effluent is from 20 to 25% to precipitate the gamma globulins, and centrifuging to recover said gamma globulins.

3. The method of recovering human serum globulins from mixtures of human serum beta and gamma globulins which comprises, suspending a mixture of human serum beta and gamma globulins in 0° C. pyrogen-free water in the proportion of from 8 to 10 liters per kilogram of said mixture, adding dilute acetate buffer solution of pH 3.5 to 4 until the pH is 4.80±0.05, stirring for from 1 to 2 hours at 0° C., adding a solution made up by adding 2640 ml. of 0.05 mole of disodium phosphate and 2260 ml. of 0.05 mole of acetic acid until the pH is 5.13±0.05, stirring said suspension, adjusting the volume with 0° C. pyrogen-free electrolyte solution to 20 liters per kilogram of mixture suspended, adding 53.3% ethanol until the ethanol concentration is approximately 17% and the ionic strength is 0.010 to 0.015 to precipitate the beta globulins, stirring, centrifuging at a temperature of —6° C. to remove said precipitate, filtering the effluent, adding sodium acid carbonate solution to said effluent until the pH is 7.1±0.1, adding 95% ethanol until the ethanol concentration is approximately 20 to 25% to precipitate the gamma globulins, and centrifuging at a temperature of —5° C. to recover said gamma globulins.

4. The method of recovering human serum gamma globulins which contain certain immune bodies, from mixtures of human serum beta and gamma globulins, which comprises suspending a mixture of human serum beta and gamma globulins in pyrogen-free water, adjusting the hydrogen ion concentration of the suspension to pH 4.0 to 5.1, allowing the resulting suspension to stand for approximately twenty-four hours, adjusting the hydrogen ion concentration of the suspension to pH 5.13±0.05, introducing ethanol into the resulting adjusted suspension until an ethanol concentration of from substantially fifteen per cent to seventeen per cent is reached, maintaining the suspension at an ionic strength of from 0.010 to 0.015 following the addition of the ethanol, stirring the resulting suspension for substantially one to two hours, centrifuging the suspension at a temperature just above the freezing point of the solution, filtering the suspension, adding sodium bicarbonate solution to the resulting effluent until the solution reaches a pH value of from 7.0 to 7.2, adding ethanol to the said effluent until the ethanol concentration is from approximately twenty per cent to twenty-five per cent, and recovering the resulting precipitate which consists essentially of gamma globulins.

5. The method of recovering human serum gamma globulins which contain certain immune bodies, from mixtures of human serum beta and gamma globulins, which comprises adding the paste of human serum beta and gamma globulins in an aqueous solution of sodium chloride, increasing the volume of the resulting suspension by adding pyrogen-free water to bring the volume of suspension to approximately eighteen liters for each kilogram of paste suspended, adjusting the pH value of the resulting suspension to pH 4.0 to 5.1, allowing the resulting suspension to stand for twenty-four hours, then adjusting the pH value of the suspension to pH 5.13±0.05, further increasing the volume of the suspension to about twenty liters for each kilogram of the paste suspended, adding ethanol to the suspension until an ethanol concentration of from approximately fifteen per cent to seventeen per cent is reached, maintaining the resulting suspension at an ionic strength of approximately 0.010 to 0.015 following the addition of the ethanol, stirring the resulting suspension for from approximately one to two hours, centrifuging the suspension at a temperature just above the freezing point of the solution, filtering the suspension, adding sodium bicarbonate solution to the resulting effluent from the filtering until the said effluent has a pH value of from 7.0 to 7.2, adding ethanol to the said effluent until the ethanol concentration is approximately twenty to twenty-five per cent, and recovering the resulting precipitate of gamma globulins by centrifuging, suspending in water, shell freezing and drying, the entire process being carried out at temperatures not substantially exceeding 0° C.

JOHN W. WILLIAMS.
HAROLD F. DEUTSCH.

REFERENCES CITED

The following references are of record in the file of this patent:

UNITED STATES PATENTS

| Number | Name | Date |
|---|---|---|
| 2,385,803 | Cohn et al. | Oct. 2, 1945 |
| 2,390,074 | Cohn | Dec. 4, 1945 |

OTHER REFERENCES

Cohn, Chemical Reviews, vol. 28, pages 395 to 417 (1941).

Cohn et al., J. Am. Chem. Soc., vol. 62, pages 3396 to 3400 (1940).